United States Patent
Hendel et al.

(10) Patent No.: US 7,142,540 B2
(45) Date of Patent: Nov. 28, 2006

(54) METHOD AND APPARATUS FOR ZERO-COPY RECEIVE BUFFER MANAGEMENT

(75) Inventors: Ariel Hendel, Cupertino, CA (US); Jochen Behrens, Santa Cruz, CA (US); Ajoy Siddabatuni, Newark, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 1071 days.

(21) Appl. No.: 10/198,923

(22) Filed: Jul. 18, 2002

(65) Prior Publication Data

US 2004/0013117 A1    Jan. 22, 2004

(51) Int. Cl.
*H04L 12/28* (2006.01)

(52) U.S. Cl. ............... 370/392; 370/412; 711/105

(58) Field of Classification Search ............ None
See application file for complete search history.

(56) References Cited

U.S. PATENT DOCUMENTS

| | | | | |
|---|---|---|---|---|
| 5,664,116 | A | * | 9/1997 | Gaytan et al. ............ 709/234 |
| 5,870,394 | A | * | 2/1999 | Oprea ..................... 370/392 |
| 5,937,169 | A | * | 8/1999 | Connery et al. .......... 709/250 |
| 6,564,267 | B1 | * | 5/2003 | Lindsay ................... 709/250 |
| 6,990,535 | B1 | * | 1/2006 | Yang et al. ............... 710/3 |

OTHER PUBLICATIONS

Sapuntzakis, C., Romanow, A., Chase, J., "The Case for RDMA", Internet Draft, Dec. 2000, pp. 1-12, Duke University Website, Durham, NC., www.cs.duke.edu/art/publications/draft-csapuntz-caserdma-00.

Kurmann, C., Muller, M, Rauch, F., Stricker, T., "Speculative Defragmentation-A Technique to Improve the Communication Software Efficiency for Gigabit Ethernet", Laboratory for Computer Systems, Aug. 1, 2000, pp. 131-138, Zurich, Switzerland.

* cited by examiner

*Primary Examiner*—Duc Ho
(74) *Attorney, Agent, or Firm*—Park, Vaughan & Fleming LLP

(57) ABSTRACT

An apparatus and method for managing the receipt of communication traffic in the form of packets or other units. The apparatus includes a communication interface (e.g., a NIC, a TCA) coupled to one or more host computer systems. Through Direct Memory Access (DMA) operations, the interface reassembles payloads of received packets into host buffers based on their sequence numbers, without buffering them in the interface. Packet headers are separated from the payloads and passed to a host for protocol processing after the payload DMA is completed. Host buffers may be of virtually any size. For each communication connection, state information is maintained on the interface, which may identify an upper level protocol so that an upper level protocol header is passed to the host as part of the packet header, not as part of the payload. Protocol termination remains in the host.

54 Claims, 5 Drawing Sheets

METHOD AND APPARATUS FOR ZERO-COPY RECEIVE BUFFER MANAGEMENT

BACKGROUND

This invention relates to the fields of computer systems and communications. More particularly, a method and apparatus are provided for managing receipt of communication traffic.

In many computing environments, communications are segmented and conveyed as packets, frames, cells or other units. Depending on the size of the original communication, it may result in the transmission of many packets. To reconstitute the communication, a recipient must allocate and control sufficient resources to adequately manage the receipt and reassemble each packet in its correct position.

Traditionally, a hardware device (e.g., a Network Interface Card or NIC) receives packets from a communication link. The device places the packets in shared buffers and passes them to a host processor or other module for processing in accordance with their corresponding protocols. Only at this stage of handling could the ultimate destination of a packet (e.g., an application) be determined. In particular, the host would parse the packet's headers, identify and retrieve a packet payload and copy that payload to an appropriate storage location.

The short period of time available to the hardware device for processing a packet, coupled with its lack of knowledge of the destination or status of the corresponding communication connection, prevented the hardware device from being able to forward the packet directly to its destination. Typically, only the processor applying a packet's protocol stack had access to the information needed to correctly direct the packet.

Thus, after a packet is received from a communication link, it is traditionally buffered at the receiving device for some initial processing (e.g., to compute a checksum, identify the communication connection corresponding to the packet). Then it is copied to a host processor for further processing, after which it is copied again to its destination application or other consumer.

Each time the packet is copied or buffered, additional resources are consumed, the packet is further delayed and the efficiency of the overall process declines. Management of the buffers adds yet more overhead to the process. And, as data rates of networks and other communication links continue to increase, host processors are forced to process more and more packets, and it is possible that congestion may occur if they must continue to handle every packet.

One attempted solution to the need for efficient management of incoming packet traffic involves moving protocol processing to the receiving device (e.g., a NIC). However, this makes it harder to update protocol processing procedures, and, some packets may still need to be handled by a processor (e.g., because of error conditions). Also, packet payloads still need to be handled multiple times (e.g., by the receiving device and a host processor) before being passed to their ultimate destinations.

Thus, an apparatus and method are needed for reducing the amount of processing necessary to separate a packet payload from its headers and pass the payload to its destination.

SUMMARY

In one embodiment of the invention, an apparatus and method are provided for facilitating the reassembly of packet payloads directly into host memory buffers from a communication interface. In this embodiment, the payloads need not be buffered or temporarily stored in the communication interface and need not be handled by a host processor. However, packet headers are passed to the host processor. Thus, protocol termination remains in the host, while payload storage is performed by the communication interface.

In this embodiment, when a packet is received at the communication interface, its communication connection is identified, its payload is delineated and a sequence number (e.g., a TCP sequence number) of the payload is determined. From per-connection data stored on the interface, an anchor sequence number and anchor buffer identifier are retrieved. The anchor sequence number is a sequence number associated with the beginning of a receive translation window for the connection, while the anchor buffer identifier identifies a host buffer encompassing the anchor sequence number. The connection data may also include a circular list of host buffers for receiving connection payloads, states of those buffers (e.g., to indicate whether they are available), the length of the buffer list, a size of the buffers, etc.

The payload sequence number is compared to the anchor sequence number to determine whether and where the payload falls within the translation window. The sequence numbers of the beginning and end of the payload may be considered to determine which buffer(s) the payload should be stored in. Illustratively, the host buffers may be seen as "overlaying" the sequence number space of the connection, so that each sequence number with the sequence number space maps to a location within one of the buffers. Payloads of consecutive packets within the connection are stored contiguously within the buffers. Because each byte within the connection stream maps to a specific byte within the host buffers, payloads may be received out of order and still be stored correctly.

When a payload's destination buffer is identified, it is stored in that host buffer via DMA (Direct Memory Access), without requiring action by the host processor. After the payload is successfully stored, the header portion of the packet is forwarded to the host processor. If the translation from payload sequence to host memory location fails, the entire packet may be forwarded to the host processor.

In an embodiment of the invention, if a packet payload includes an upper layer protocol header (e.g., for NFS—Network File System), the upper layer protocol header will be included in the header portion of the packet sent to the host processor. Only the upper layer payload will be sent directly to a host buffer via DMA.

DETAILED DESCRIPTION

Figure 1:
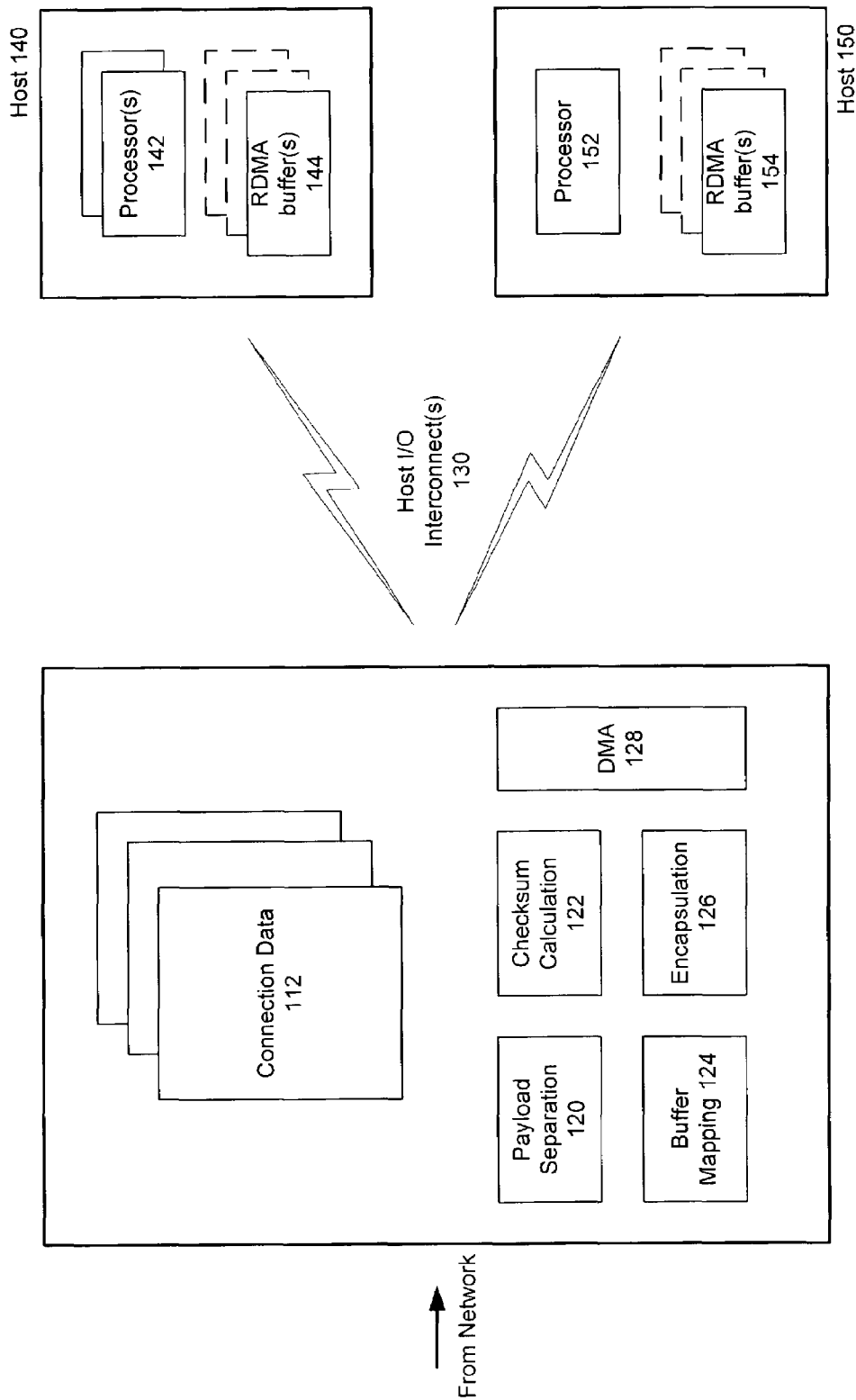
FIG. 1 is a block diagram depicting a system for applying zero-copy buffer management, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In an embodiment of the invention, a method and apparatus are provided for managing the receipt of communication traffic from a network or other link.

In this embodiment, traffic is received in the form of packets, cells, frames or other units. Upon receipt, packet payloads are forwarded directly to their destination host, application or consumer through DMA (Direct Memory Access) operations, without requiring intermediate buffering or copying.

This embodiment of the invention is described as it may be implemented in a computing system or subsystem configured to receive TCP/IP (Transmission Control Protocol/Internet Protocol) communications over one communication link and forward those communications to one or more hosts through an InfiniBand network or connection. From this description, implementations of the invention suitable for other communication protocols and environments may be devised without exceeding the scope of the invention.

In this embodiment of the invention, a communication interface such as a TCA (Target Channel Adapter) or NIC (Network Interface Card) receives packets from a network or other communication link. The interface separates a packet's payload from its headers, transfers the payload to a host memory buffer (via DMA or remote DMA (RDMA)) and forwards the headers to a host for protocol processing. Thus, buffer management for incoming traffic (performed by the interface) is separated from protocol processing (performed by a host processor) without terminating the TCP connection at the interface.

Illustratively, the buffer location in which a packet payload is stored via DMA is determined from the sequence number of the packet. For each connection the interface maintains a list of buffers in which the connection payloads should be stored, plus information regarding which buffer a particular sequence number should be mapped to. The host buffers may be of virtually any size and may therefore be tailored to a particular application or connection.

FIG. 1 depicts a system in which an embodiment of the invention may be implemented. In this embodiment, packetized communication traffic is received at communication interface 110 from a network or other link. The communication interface may be a NIC, a TCA or some other interface configured to receive packets on behalf of a host computer system. Illustratively, communication interface 110 may comprise a communication or input/output subsystem serving one or more host devices.

Hosts 140, 150 are illustrative computer systems comprising destination applications or other consumers of packets received from the network. Any number of hosts may be served by communication interface 110, and may include servers, workstations or other computing devices.

A host may include one or more processors, such as processors 142 for host 140, and processor 152 of host 150. Each host also includes any number of buffers (144, 154) for receiving packet payloads from the communication interface via DMA.

Communication interface 110 communicates with hosts 140, 150 through host input/output interconnect(s) 130, which may be wired or wireless and may include direct connections and/or network connections. In one implementation, interconnects 130 comprise an InfiniBand fabric. In other implementations, other input/output interfaces that provide DMA capability may be applied, such as PCI (Peripheral Component Interface) or one of its variants (e.g., PCI-X, PCI-Express).

Communication interface 110 may be configured to receive IP (Internet Protocol) packets from a network, and send layer four (e.g., TCP) packet payloads to the hosts for consumption. Although configured for TCP/IP traffic in one embodiment of the invention (e.g., wherein the network may be the Internet), other embodiments may be configured for other protocols.

Communication interface 110 includes a set of connection data 112 for each connection for which it transfers payloads to host memory via DMA. A set of connection data 112 may comprise a table, a database or some other data structure. Illustratively, each connection's set of data identifies a host to receive connection payloads, one or more host buffers in which to store the data, and information for identifying a buffer location in which to store a particular payload.

Communication interface 110 also includes functionality for facilitating the reassembly of connection payloads into host buffers. In different embodiments of the invention, such functionality may include any or all of payload separation 120, checksum calculation 122, buffer mapping 124, encapsulation 126 and DMA 128.

As part of payload separation 120, the communication interface logically separates a payload portion of a packet from a header portion. As part of checksum calculation 122, the interface calculates a checksum on all or a part of the packet. Buffer mapping 124 involves mapping a packet payload (e.g., by its sequence number) to a host memory location (e.g., a position within a host buffer) at which the payload can be reassembled with payloads of other packets from the same connection. Encapsulation 126 comprises the forwarding of the packet header portion to a host, for protocol processing, while DMA coding 128 handles transfer of a payload to a host memory buffer. Each of these tasks is described in additional detail below.

In the embodiment of the invention illustrated in FIG. 1, packets received at communication interface 110 are separated into their payload and header portions in accordance with payload separation 120. By dividing packets in this manner, protocol processing of headers can be separated from the storage of payloads and management of the storage buffers. More specifically, from the sequence number of a packet payload, a host buffer is identified through buffer mapping 124, and the payload is placed in the buffer through DMA in accordance with DMA transfer 128. After the DMA is completed, the header portion of the packet is forwarded to a host processor according to encapsulation 126. Thus, the host processor maintains the state of a protocol (e.g., TCP), but is normally not called upon to move payloads.

Illustratively, once a host buffer is posted to a connection, and until it is purged, it is only used for that connection. Therefore, its size can be tailored to the connection, and packet payloads can be stored contiguously within the buffer to reassemble the original message or datagram. Even if a packet is received out of order, it can still be stored in the correct location because that location is derived from the packet's sequence number. No reassembly buffers are required in the communication interface in this embodiment of the invention.

Figure 2:
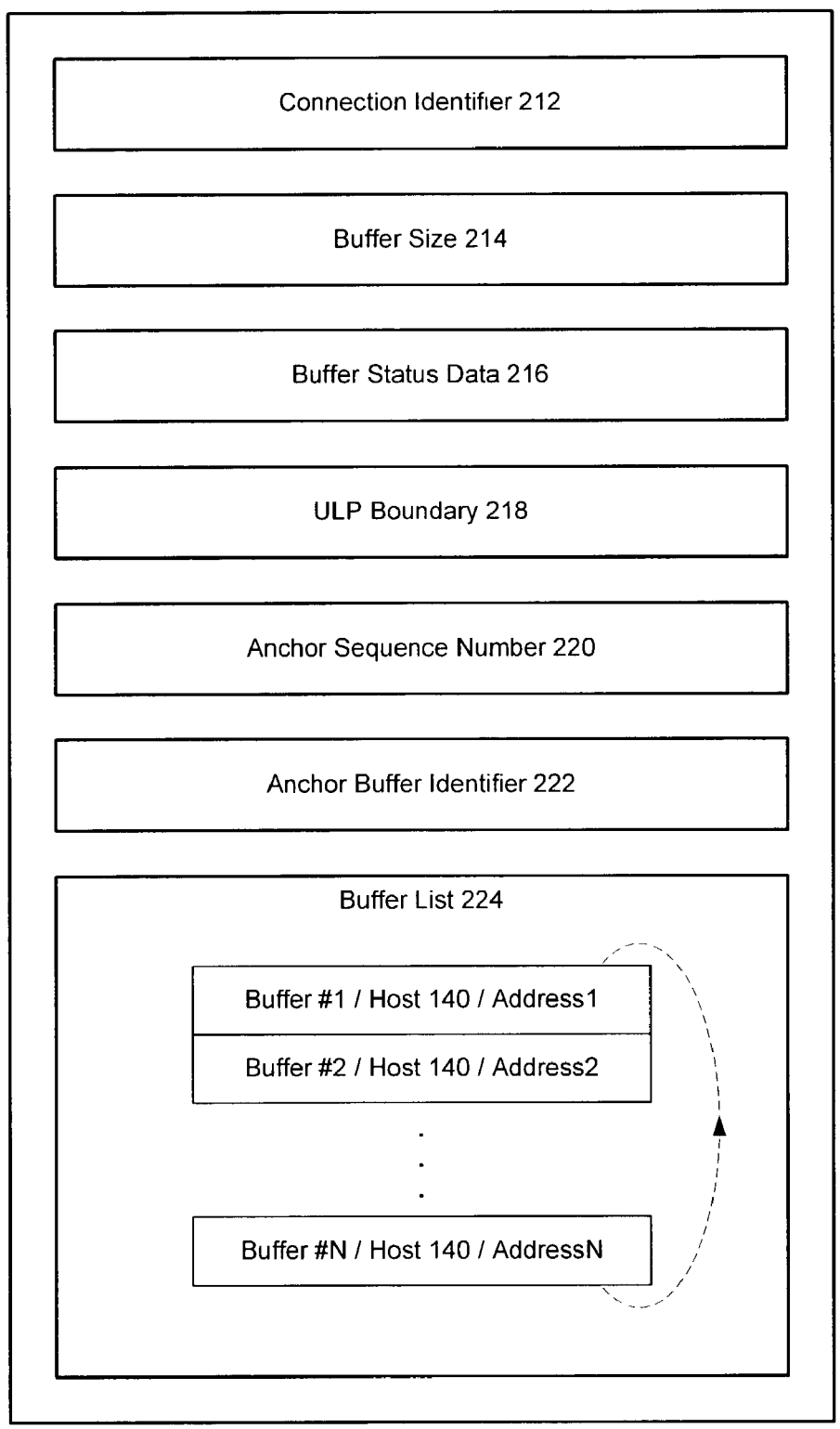
FIG. 2 depicts the contents of an illustrative connection table, in accordance with an embodiment of the invention.

FIG. 2 demonstrates a set of connection data (e.g., a connection table) according to one embodiment of the invention. The indicated data are merely illustrative; other embodiments of the invention may employ more or less data than depicted in FIG. 2.

Connection table 210 corresponds to one connection at a communication interface for which the interface reassembles payloads in host memory via DMA. Connection identifier 212 identifies that connection (e.g., a TCP connection), and may comprise addresses or identifiers of the source and/or destination endpoints of the connection. In an embodiment of the invention configured for an InfiniBand environment, connection identifier 212 may be a queue pair.

Buffer size 214 indicates the size of a buffer posted for use with the connection. When a connection is opened and connection table 210 is initialized for the connection, an appropriate buffer size may be specified or requested by an application associated with the connection, a default size may be applied, or the size may be tailored to the purpose of the connection. For example, a large buffer size may be employed for receiving a multimedia file. Buffer size 214 may be constant or dynamic, and all buffers for a connection may or may not be of the same size. In one implementation, buffer sizes are limited to powers of two, within the range of eight kilobytes to eight megabytes.

Buffer status data 216 provides status information regarding buffers for receiving the connection's payloads. For example, buffer status data 216 may include an indication of the number of buffers the table is configured for (e.g., the length of buffer list 224).

Buffer status data 216 may also indicate which buffers are currently available (e.g., which buffers have or have not been posted). Illustratively, a connection table may be configured for a certain number of buffers, but they need not all be available at one time. Thus, buffer status data 216 may indicate, for each buffer, whether or not it has been posted. For example, a first value (e.g., one) may be stored for each buffer that is available, and a different value (e.g., zero) may be stored for buffers that are not yet posted or that are being consumed.

Each buffer of a connection table may be associated with another indicator configured to indicate whether the buffer should be automatically unmapped when it has been filled.

ULP boundary 218 comprises a sequence number (e.g., a TCP sequence number) defining the end of an upper layer protocol payload. For example, for an NFS (Network File System) read request, the length of the transaction may be known in advance, in which case ULP boundary 218 may be set accordingly.

Anchor sequence number 220 is the sequence number associated with a receive translation window for the connection. It also marks the beginning of the buffer in which a payload having the next expected sequence number will be stored. Anchor buffer identifier 222 identifies the buffer (within buffer list 224) that corresponds to the anchor sequence number. Together, anchor buffer identifier 222 and anchor sequence number 220 comprise an "anchor" for use in mapping sequence numbers of received packets to the appropriate host buffer in which the packet payloads should be stored.

Illustratively, when a new connection is opened and connection table 210 is initialized for the connection, anchor buffer identifier 222 is configured to identify the first buffer in the buffer list (e.g., buffer number zero). Anchor sequence number 220 is set to the value ISN+1. As one skilled in the art will appreciate, when a TCP connection is opened, an ISN (Initial Sequence Number) is (randomly) assigned to mark the beginning of the TCP stream.

In another embodiment of the invention, the anchor sequence number need not coincide with the beginning of a buffer. Instead, an anchor buffer "start offset" field may be defined (e.g., within connection table 210) to indicate an offset of the anchor sequence number within a buffer (e.g., the buffer corresponding to anchor buffer identifier 222).

In FIG. 2, buffer list 224 identifies one or more host buffers (e.g., with pointers, identifiers or addresses) into which packet payloads are to be DMA'd. In buffer list 224, N buffers are allocated to the connection indicated by connection identifier 212. Illustratively, an entry in list 224 may include a buffer identifier, an identifier of the host in which the buffer is located, and an address at which the buffer begins. The address of a buffer may comprise any or all of a processor identifier, a memory address, a partition, an offset, etc. In one implementation of the invention for an InfiniBand environment, a buffer address may comprise the upper bits (e.g., the upper 51 bits) of a DMA or RDMA virtual address, plus the corresponding R_key. And, the number and size of buffers in buffer list 224, when combined, should encompass the size of the (TCP) receive window of the connection.

In the illustrated embodiment of the invention, buffer list 224 is a circular list and the combined areas of the buffers provides sufficient storage space to cover some or all of the total sequence number space in the communication connection specified by connection identifier 212.

More particularly, the combined buffer area creates a sliding receive translation or mapping window for translating or mapping incoming sequence numbers (i.e., payloads) to their designated buffer storage locations within the DMA space of the destination host. The translation process is further described below in conjunction with FIG. 4. The buffer list may be repeatedly applied to portions of the total sequence number space. Thus, if all N buffers in list 224 are used before the connection ends, the translation or mapping process will restart at the beginning of the list. Upon reuse, each buffer identifier or pointer in the list may identify or point to the same or a different buffer as the last time through the list.

Even though a receive translation window may be smaller than the total sequence space of a connection, there is no aliasing problem because the sequence number of a payload is compared to the receive translation window before the payload is DMA'd to the corresponding host buffer within the window.

In illustrative embodiments of the invention, host buffers may be provided by a particular application or may be drawn from a kernel buffer pool. Because packet payloads are mapped to and stored in host buffers on the basis of their sequence numbers, the packets need not be received in order.

Figure 3:
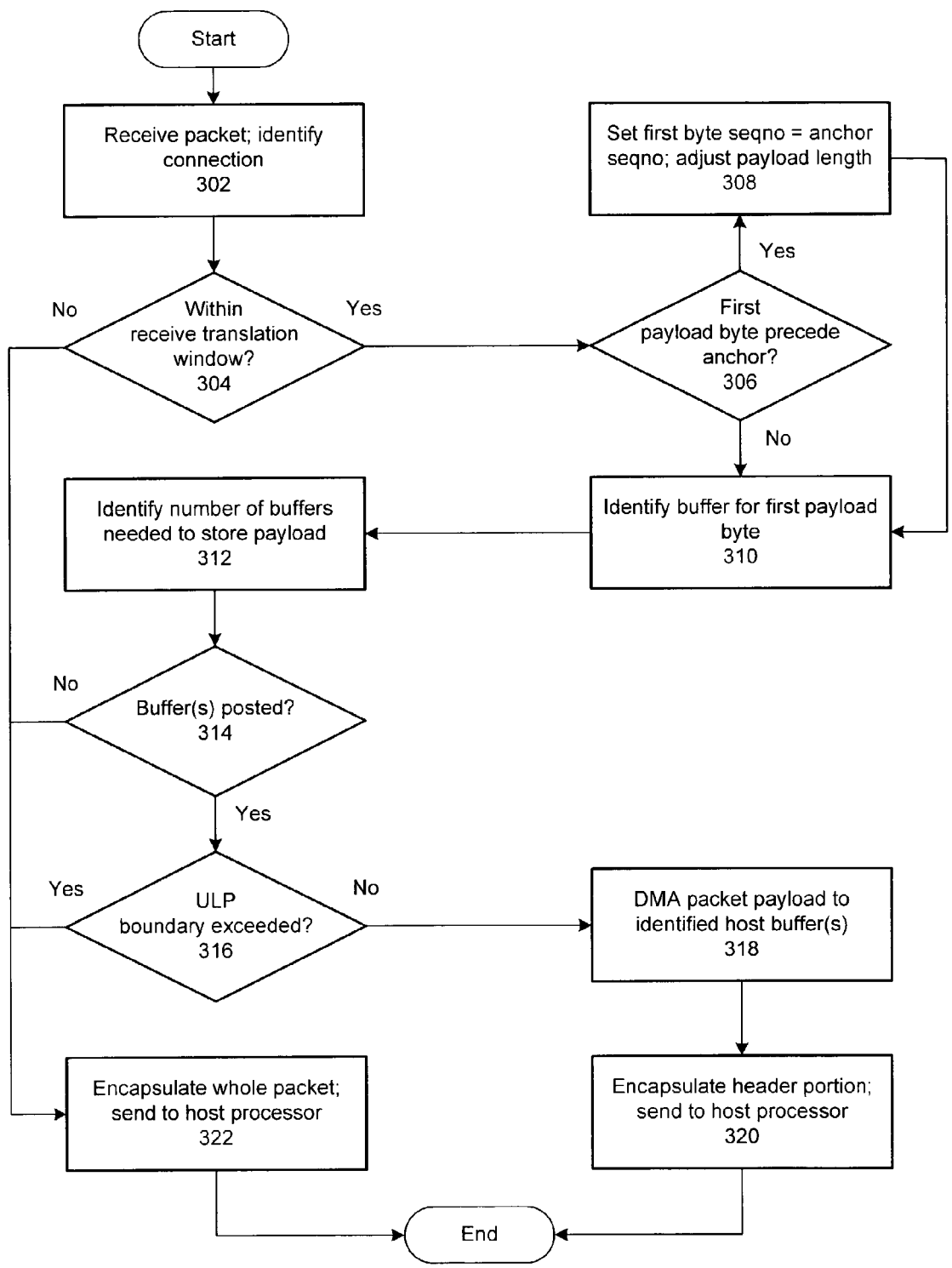
FIG. 3 is a flowchart demonstrating one method of reassembling packet payloads directly into host memory, in accordance with an embodiment of the present invention.

FIG. 3 demonstrates a method of storing a received packet's payload in a host buffer, without intermediate buffering, according to one embodiment of the invention. In this embodiment, a communication interface (e.g., a NIC or TCA) receives packets from a network on behalf of one or more host computers, any of which may include multiple processors. The communication interface may be part of one of the host computers, or may be located in a separate enclosure (e.g., as part of an input/output subsystem).

The illustrated method is configured for receiving TCP traffic over IP (IPv4 or IPv6), but may be modified for other communication protocols without exceeding the scope of the invention.

In operation 302, a packet is received from the network. The communication interface parses the packet to identify its connection (e.g., TCP connection), retrieve a sequence number, identify a payload, etc. The interface may parse any or all of the layer 2–4 headers (e.g., MAC, IP, TCP) and may parse higher layer headers as well.

A lookup table may be consulted to determine the packet's destination (e.g., to identify an InfiniBand queue pair, a host processor). After identifying the connection, the interface retrieves (e.g., from local memory) a set of status data (e.g., a connection table) pertaining to that connection, such as connection table 210 of FIG. 2. The set of data identifies buffers for reassembling the TCP data, and includes an anchor identifying the start of the receive window for the connection and the corresponding anchor buffer.

In operation 304, the interface retrieves a sequence number of the packet and determines whether the packet payload falls within the connection's receive translation window. Illustratively, the sequence number of the last byte of the packet's payload may be compared to the connection anchor.

More particularly, in one implementation of this embodiment, the communication interface compares the anchor sequence number (the starting sequence number of the receive translation window) to the sum of the packet's sequence number (e.g., TCP sequence number) and the length of the packet payload (e.g., TCP segment length). If the anchor sequence number precedes the sum, then the payload ends somewhere after the start of the window.

Then the interface takes the sum of the packet sequence number and the payload length and subtracts the anchor sequence number. This value is then divided by the buffer size (reported in the connection table) and the result is compared to the length of the connection table buffer list to ensure that the packet payload does not extend beyond the receive translation window. In this implementation, the number and size of buffers in the connection table buffer list covers (e.g., equals or exceeds) the size of the translation window.

If the packet payload does not fall within the receive translation window, the illustrated method advances to operation 322. Otherwise, the method continues with operation 306.

In operation 306, the communication interface determines whether it must adjust the payload definition. This may be necessary if the first payload byte precedes the connection anchor. If the first payload byte precedes the anchor sequence number, the method continues with operation 308; otherwise, the method proceeds to operation 310.

In operation 308, the sequence number of the first byte of the payload is set to the anchor sequence number. And, the length of the payload is adjusted accordingly. Illustratively, the length of the payload is set to the reported payload length (e.g., as read from the packet) minus the difference between the anchor sequence number and the packet sequence number retrieved in operation 304.

In operation 310, the interface identifies the host buffer in which the first payload byte should be stored. Illustratively, the calculation may be similar to the following:

$$\text{anchor\_buffer} + ((\text{first\_byte\_seqno} - \text{anchor\_seqno}) / \text{bufsize}) \text{ MOD length}$$

In this calculation, "anchor_buffer" is the host buffer located at the connection anchor. "First_byte_seqno" is the sequence number of the first byte of the packet payload and "anchor_seqno" is the anchor sequence number. "Bufsize" is the host buffer size reported in the connection table, and "length" indicates the number of buffers in the connection table buffer list.

In operation 312, the communication interface determines whether more than one buffer is needed to store the packet payload. Illustratively, if the buffer size is at least as large as the MTU (Maximum Transmission Unit), then no more than two buffers should be needed. Illustratively, the interface may determine whether:

$$(\text{first\_byte\_seqno} - \text{anchor\_seqno}) \text{ MOD bufsize} + \text{payload\_size} > \text{bufsize}$$

This calculation determines whether the packet payload straddles the boundary between two buffers.

In operation 314, the communication interface determines whether the necessary buffer(s) is/are posted (i.e., available for DMA). This determination may be made by examining buffer status data within the connection table. If the buffers are not presently posted, the method advances to operation 322.

In operation 316, the interface determines whether an upper layer protocol (ULP) boundary was exceeded, if such a boundary was set. The ULP boundary marks the expected end of the ULP data. Specifically, the interface calculates whether the ULP boundary falls before the sum of (first_byte_seqno+payload_size). If so, the method proceeds to operation 322.

In operation 318, the packet payload is stored in the identified buffer(s) via one or more DMA operations (i.e., one operation for each buffer).

In operation 320, if the DMA operation(s) is/are successful, the header portion of the packet is encapsulated and sent to a host processor as a message.

The method of FIG. 3 then ends.

In operation 322, the communication interface could not map or translate the packet to an available host buffer. The packet may fall outside the receive translation window, a buffer may not be available to store the payload, a ULP boundary may have been exceeded, etc. Therefore, the entire packet is encapsulated and sent to a host processor as a message. In general, a packet can always be encapsulated and sent to a host processor in the event of an error or unusual circumstance that makes it difficult or impossible to successfully DMA the packet's payload into a designated host buffer. The host may perform the same calculations as above to determine where to store the payload of an encapsulated packet.

Illustratively, a host processor that receives and processes a packet header (or an entire packet) may instruct the communication interface to update connection table data for the packet's connection. For example, the anchor may be adjusted as the receive translation window slides along the connection space, when a buffer is posted or consumed (thereby necessitating an update to a buffer status), etc.

Thus, although the connection table is stored on the communication interface, it may be maintained by a host processor configured to handle protocol processing for the connection. For example, the host processor may send maintenance instructions to a local processor of the communication interface when the connection table should be modified.

Host buffers may be automatically unmapped and consumed when filled and/or when all expected connection data are received (e.g., a ULP end boundary is reached). A host buffer may also be explicitly purged by an application, operating system or device driver. When a buffer is unmapped or purged, the connection table is updated to mark the buffer as unavailable.

A host buffer may be explicitly posted for a connection, at which time the connection table is updated to show that the buffer is available.

When a buffer is unmapped or purged, the connection anchor is updated accordingly. In particular, the anchor buffer identifier and the anchor sequence number are advanced. Thus, when a new connection is opened, and a corresponding connection table is initialized, the connection anchor is set to the first buffer and the anchor sequence number is derived from ISN (e.g., ISN+1). Thereafter, as buffers are posted and consumed, the anchor is updated to move with the receive window.

Figure 4:
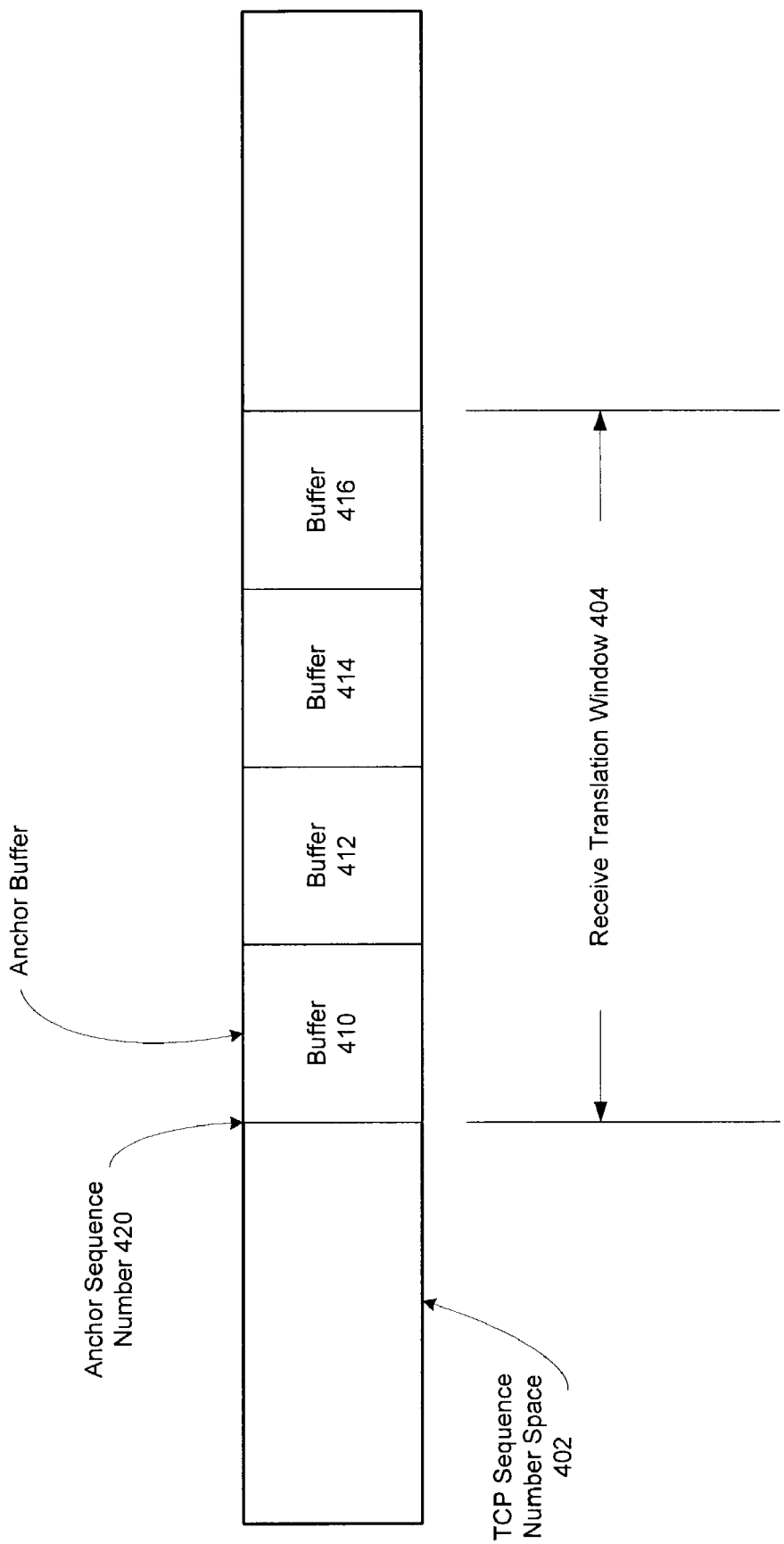
FIG. 4 depicts a connection anchor for facilitating management and reassembly of packet payloads in accordance with an embodiment of the present invention.

FIG. 4 illustrates the relationship between a connection anchor and the sequence number space of a communication connection, according to one embodiment of the invention. In this embodiment, the connection is a TCP connection and the sequence number space is based on the TCP sequence numbering of packets within the connection. Other embodiments may be derived from this description (e.g., for other communication protocols or environments) without exceeding the scope of the invention.

In FIG. 4, receive translation window 404 slides along TCP sequence number space 402 as connection data are received and acknowledged. Host memory for receiving the TCP payloads includes buffers 410, 412, 414 and 416, which are included in the buffer list of the connection table associated with the illustrated connection. The buffer list may include additional buffers not shown in FIG. 4 (i.e., the buffer list length is not limited to the size of the receive TCP window). Thus, in this embodiment of the invention, the size of the receive TCP window≦(buffer size×length of the buffer list).

The first buffer of the current received translation window (i.e., buffer 410)—the buffer at the beginning of the window—is considered the anchor buffer of the connection. Thus, the anchor for the illustrated connection comprises anchor sequence number 420 (marking the beginning of the anchor buffer) and an identifier of the anchor buffer (e.g., its index within the connection table buffer list).

In the embodiment of FIG. 4, as long as the last byte of each received TCP segment falls within receive translation window 404, and the necessary buffers are mapped in, the segment payloads are written to host memory via DMA. Following a successful DMA operation, the segment headers are forwarded to a host processor, which implements the appropriate protocol behavior without having to handle the payloads.

Thus, knowledge of the TCP state and the status of the TCP stream remains with the host, but can be used to update the connection anchor on the communication interface. For example, when buffer 410 is unmapped (e.g., because it is filled), buffer 412 becomes the anchor buffer and the anchor sequence number is updated to the beginning of buffer 412.

In one embodiment of the invention, a connection payload may include a header of an upper layer protocol. For example, a first TCP segment received in response to an NFS read request may include an NFS header. Therefore, adjustments may be made in the way such a payload is handled. The translation window (e.g., connection buffer size×length of buffer list) is still at least as large as the TCP receive window for the NFS connection, even if the expected size of the transaction is smaller than the TCP window. The number of buffers actually mapped for the connection may, however, be limited to the number needed for the expected transaction.

In this embodiment of the invention, when the anchor is set for a new connection, the ULP header should be taken into consideration. Thus, the initial anchor sequence number may be set based on the ISN of the connection plus the expected size of the NFS header that will be received in the first segment. The initial anchor sequence number thus identifies the expected beginning of the NFS payload. Any portion of a segment that precedes the initial anchor sequence number will be considered part of the segment header and will be encapsulated and forwarded to a host processor. The anchor buffer will still be the buffer that includes or starts with the anchor sequence number.

Illustratively, the NFS client that issues a read request may signal the expected size of the transaction and the NFS header that will be received with the transaction. A host processor serving the client may then compute the anchor and ULP end boundary for the transaction and pass these values to the communication interface, where they are incorporated into a connection table for the transaction.

When a ULP end boundary is reached during a payload DMA operation in this embodiment, the entire transaction may be considered complete and all buffers posted for the connection may then be unmapped. When a connection is terminated, its connection table may be torn down.

Figure 5:
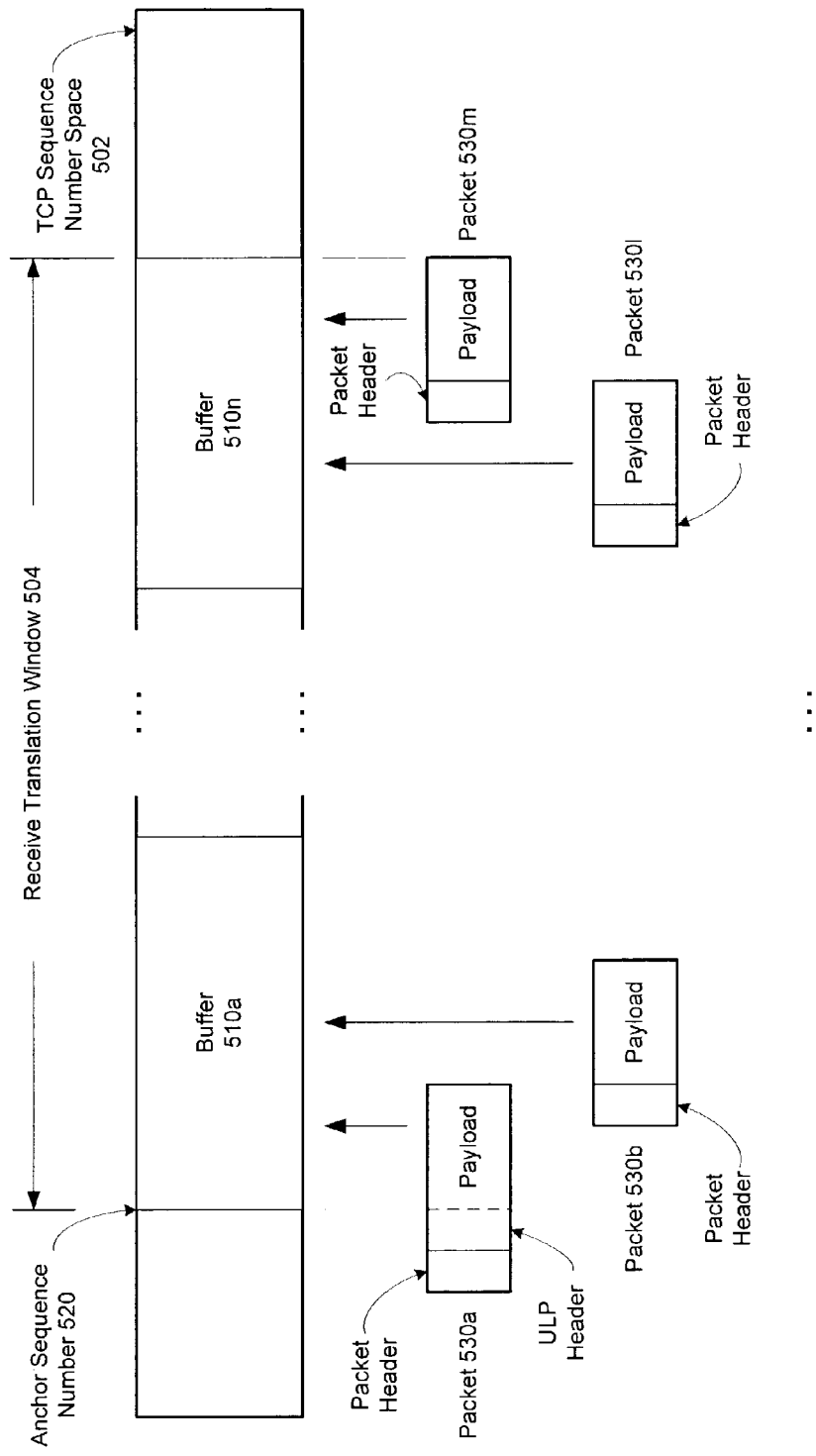
FIG. 5 depicts the translation or mapping of packet payloads to host buffers within a receive translation window, in accordance with an embodiment of the invention.

FIG. 5 demonstrates the translation or mapping of packet payloads to one or more buffers within a receive translation window, according to an embodiment of the invention.

Packets 530a, 530b, 530l and 530m are part of a stream of packets carrying an NFS message, and each packet includes a header and payload. Packet 530a, the first packet of the NFS transaction, also includes a ULP header. As demonstrated in FIG. 5, the payloads are contiguously stored in host buffers allocated to the connection. The packet headers (including the ULP header) are encapsulated and forwarded to a host processor for protocol processing.

As described above, the ULP header is treated as part of the packet header for packet 530a because it precedes anchor sequence number 520. Therefore, during the mapping of packet 530a, the first sequence number of the connection (e.g., the ISN) is mapped to anchor sequence number 520, which anchors receive translation window 504.

Illustratively, for a longer stream of packets (e.g., beyond packet 530m), buffer 510a could be re-mapped to the next portion of the TCP sequence number space 502 (e.g., adjacent to buffer 510n in FIG. 5).

In one embodiment of the invention, the communication interface computes a checksum on a packet to verify its integrity before using DMA to store the packet's payload in host memory. Illustratively, the interface may perform a full checksum (i.e., to include the header or pseudo-header), not just a checksum on the payload. If the computed checksum does not match the checksum received with the packet, the entire packet may be encapsulated and forwarded to a host processor for action.

Because of the inherent reliability of DMA operations, problems with DMA writes typically involve reporting that one was done when it was not, or, performing the write to a different location than reported. Therefore, in an embodiment of the invention, after a packet's payload is written to a host buffer via DMA, evidence of the DMA operation is included with the encapsulated packet header sent to a host processor so that the host can verify the DMA operation(s).

Illustratively, the communication interface sends the first and last bytes of the packet payload. It may be recalled that the host maintains the protocol state and remotely manages the connection table, and is therefore aware of where each packet payload should be stored. Thus, the host can compare the provided payload bytes against what is stored in the buffer locations that should receive the first and last payload bytes. In this embodiment, the host may be configured to clear or zero each host buffer before it is posted to a connection table.

In other embodiments of the invention, some other portion of a packet payload may be provided to a host to verify the DMA operation. Yet further, a checksum of the payload, and/or a packet header, may be provided to the host for verification.

One skilled in the art will appreciate that in an embodiment of the invention described above, latency between a communication interface and a host is decreased. In particular, hosts are responsible for posting buffers for storage of incoming packet payloads and, because protocol termination is still located at the host, the host is able to determine when a buffer is full or when a connection needs a new buffer to be posted. Therefore, it is not necessary for the communication interface to specifically request and await buffers (e.g., via a descriptor ring). In other words, host buffers are pushed to the communication interface rather than being pulled.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of reassembling a payload of a packet received from a communication link, comprising:
  receiving a first packet at a communication interface;
  identifying a first connection associated with the first packet, wherein the first connection includes a host computing device coupled to the communication interface;
  for each of multiple connections, including the first connection, maintaining a list of host buffers for storing payloads of packets associated with the connections;
  separating a payload portion of the first packet from a header portion of the first packet;
  mapping a sequence number of the payload portion to a first host buffer allocated to the first connection; and
  initiating a transfer of the payload portion from the communication interface to the first host buffer via DMA (Direct Memory Access).

2. The method of claim 1, wherein said identifying, separating and mapping are performed by the communication interface.

3. The method of claim 1, wherein said maintaining comprises
  maintaining a list of host buffers including the first buffer, for storing payloads of the first connection.

4. The method of claim 3, wherein the list of host buffers is maintained by a host processor of the host computing device.

5. The method of claim 1, wherein said maintaining comprises:
  posting a buffer to the list of host buffers without receiving a request for a buffer from the communication interface.

6. The method of claim 1, wherein said maintaining comprises:
  removing a buffer from the list of host buffers when the host computing device detects that the buffer has been filled.

7. The method of claim 1, further comprising:
  remotely managing the lists of host buffers at the host computing device using a pre-defined set of commands.

8. The method of claim 1, further comprising:
  maintaining a set of parameters for facilitating said mapping;
  wherein said set of parameters is maintained by the host computing device.

9. The method of claim 8, wherein said set of parameters includes:
  said list of host buffers for storing payloads of the first connection;
  a size of the host buffers for storing payloads of the first connection; and
  an anchor sequence number configured to identify a receive window for the first connection.

10. The method of claim 9, wherein said set of parameters further includes an identifier of an anchor host buffer configured to store a payload of the next packet expected to be received in the first connection.

11. The method of claim 10, wherein said set of parameters further includes an offset to an address within the anchor host buffer;
  wherein said mapping comprises mapping the anchor sequence number to the offset address.

12. The method of claim 1, wherein said mapping comprises:
  retrieving a sequence number from the first packet; and
  comparing the packet sequence number to an anchor sequence number stored in the communication interface;
  wherein said anchor sequence number is associated with a mapping window of the first connection.

13. The method of claim 12, wherein the packet sequence number comprises a TCP (Transmission Control Protocol) sequence number.

14. The method of claim 1, wherein said mapping comprises:
  retrieving a first anchor associated with the first connection, wherein said first anchor comprises:
    an anchor sequence number configured to identify a receive window of the first connection; and
    an anchor buffer identifier configured to identify the first host buffer.

15. The method of claim 14, wherein said first anchor is retrieved from storage on the communication interface.

16. The method of claim 14, wherein said first anchor is remotely maintained by the host computing device.

17. The method of claim 1, further comprising, prior to said receiving:
    establishing the first connection; and
    configuring a first set of parameters on the communication interface to facilitate storing payloads of the first connection in one or more host buffers of the host computing device.

18. The method of claim 17, wherein said configuring comprises:
    creating said list of host buffers;
    setting an anchor sequence number based on an initial sequence number of the first connection; and
    setting an anchor buffer identifier to identify a host buffer configured to store a payload corresponding to the initial sequence number.

19. The method of claim 1, further comprising after said receiving a first packet:
    receiving a second packet of the first connection;
    mapping a payload portion of the second packet to a host buffer; and
    if a sequence number of the initial byte of the payload portion of the second packet is consecutive to the sequence number of the last byte of the payload portion of the first packet, writing the payload portion of the second packet contiguous to the payload portion of the first packet via DMA.

20. The method of claim 1, further comprising prior to said initiating:
    verifying the integrity of the payload portion.

21. The method of claim 20, wherein said verifying comprises computing a checksum on the payload portion and a first part of the header portion of the first packet.

22. The method of claim 1, further comprising:
    forwarding the header portion of the first packet to the host computing device.

23. The method of claim 22, wherein said forwarding is only performed after said transfer is completed.

24. The method of claim 22, wherein said forwarding comprises forwarding only the header portion, not the payload portion, of the first packet.

25. The method of claim 22, wherein said forwarding comprises forwarding the header portion and the payload portion of the first packet.

26. The method of claim 1, wherein said first packet is forwarded to the host computing device via encapsulation if said mapping is unsuccessful.

27. The method of claim 1, further comprising, after said initiating a transfer of the payload portion:
    initiating a transfer of the header portion to the host computing device.

28. The method of claim 27, wherein the header portion is received at the host computing device only if said transfer of the payload portion is successful.

29. A computer readable storage medium storing instructions that, when executed by a computer, cause the computer to perform a method of reassembling a payload of a packet received from a communication link, the method comprising:
    receiving a first packet at a communication interface;
    identifying a first connection associated with the first packet, wherein the first connection includes a host computing device coupled to the communication interface;
    for each of multiple connections, including the first connection, maintaining a list of host buffers for storing payloads of packets associated with the connections;
    separating a payload portion of the first packet from a header portion of the first packet;
    mapping a sequence number of the payload portion to a first host buffer allocated to the first connection; and
    initiating a transfer of the payload portion from the communication interface to the first host buffer via DMA (Direct Memory Access).

30. A method of forwarding packets from a network to a host computing device, comprising:
    receiving a packet at a network interface, wherein the packet is part of a communication connection involving a host computing device coupled to the network interface;
    identifying a payload portion of the packet;
    determining a sequence number corresponding to the payload portion;
    mapping the sequence number to a first host buffer of the host computer device in which to store the payload portion, said mapping comprising;
    comparing the sequence number to an anchor sequence number associated with a mapping window of the communication connection;
    computing a checksum on the payload portion and at least part of a header portion of the packet; and
    initiating a DMA (Direct Memory Access) operation to store the payload portion in one or more host buffers, starting with the first host buffer;
    wherein the one or more host buffers are allocated to the communication connection.

31. The method of claim 30, wherein each of the one or more host buffers is configured to contiguously store payload portions of consecutive packets of the communication connection.

32. The method of claim 30, further comprising:
    forwarding the header portion of the packet to the host computing device.

33. The method of claim 30, further comprising:
    if said mapping fails, forwarding the packet to the host computing device.

34. The method of claim 30, wherein the sequence number comprises a sequence number of the first byte of the payload portion.

35. The method of claim 30, wherein the sequence number comprises a sequence number of the last byte of the payload portion.

36. The method of claim 30, wherein said comparing the sequence number comprises:
    determining whether the sequence number falls within the mapping window of the communication connection.

37. The method of claim 36, wherein said mapping the sequence number further comprises:
    identifying a first host buffer encompassing the sequence number;
    wherein the first host buffer is one of a set of buffers mapped to the mapping window.

38. The method of claim 30, wherein said mapping the sequence number comprises:
    computing the difference between the sequence number and the anchor sequence number associated with the mapping window of the communication connection;
    dividing the difference by a host buffer size to yield an index; and
    adding the index to an anchor buffer identifier to yield an identifier of the host buffer;

wherein said anchor buffer identifier is configured to identify a host buffer encompassing said anchor sequence number.

39. A computer readable storage medium storing instructions that, when executed by a computer, cause the computer to perform a method of forwarding packets from a network to a host computing device, the method comprising:

receiving a packet at a network interface, wherein the packet is part of a communication connection involving a host computing device coupled to the network interface;

identifying a payload portion of the packet;

determining a sequence number corresponding to the payload portion;

mapping the sequence number to a first host buffer of the host computer device in which to store the payload portion, said mapping comprising:

comparing the sequence number to an anchor sequence number associated with a mapping window of the communication connection;

computing a checksum on the payload portion and at least part of a header portion of the packet; and initiating a DMA (Direct Memory Access) operation to store the payload portion in one or more consecutive host buffers, starting with the first host buffer;

wherein the one or more host buffers are allocated to the communication connection.

40. A method of reassembling packets into a host memory from a communication interface, the method comprising:

receiving at a communication interface a plurality of packets from a first connection between a first computing device and a host computing device, wherein the first connection comprises a byte stream indexed by sequence numbers, and wherein payloads of the plurality of packets define a discontinuous portion of the byte stream;

accessing a list of host buffers allocated to the first connection;

retrieving an anchor sequence number from storage on the communication interface; and for each packet in the plurality of packets:

mapping a sequence number of the packet payload to a location within a host buffer, wherein each sequence number of the byte stream maps to one and only one host buffer location;

writing the packet payload to the mapped host buffer location; and forwarding a header portion of the packet to the host computing device for protocol processing;

said anchor sequence number defining a sequence number of the byte stream that maps to the first location of the host buffer in the list of host buffers.

41. The method of claim 40, wherein one or more packets in the plurality of packets are received out of order.

42. The method of claim 40, wherein a first packet in the plurality of packets is a duplicate of a second packet.

43. The method of claim 40, wherein payloads of two or more packets in the plurality of packets overlap.

44. The method of claim 40, wherein said mapping comprises comparing a first sequence number of the first byte of the packet payload to the anchor sequence number.

45. The method of claim 40, wherein said writing the packet payload comprises writing the packet payload into one or more host buffers starting at the mapped host buffer location.

46. An apparatus for writing packet payloads directly to a host memory buffer, comprising:

a first communication port coupling the apparatus to a network;

a second communication port coupling the apparatus to one or more host computing devices;

for each of multiple connections, a list of host memory buffers allocated to the connections for storing payloads of packets of the connections;

a parser configured to:

identify a connection comprising a packet received through the first communication port for a first host computing device;

identify a payload portion of the packet; and identify a sequence number associated with the payload;

a set of data configured to facilitate direct storage of the payload into a first host memory buffer; and a DMA (Direct Memory Access) module configured to store the payload, in the first host memory buffer, contiguous to a payload of another packet in the connection.

47. The apparatus of claim 46, wherein said set of data comprises:

an anchor sequence number configured to identify a receive window for the connection;

an anchor buffer identifier configured to identify a host memory buffer; and a portion of said list of host memory buffers identifying buffers allocated to the connection, including the first host memory buffer.

48. The apparatus of claim 46, wherein the apparatus is coupled to the first host computing device by an Infiniband interconnect.

49. A communication interface for reassembling packet payloads into a host memory, comprising:

a first port coupling the communication interface to a first communication link;

a second port coupling the communication interface to one or more host computing devices;

a packet receiving module configured to receive from the first port a first packet of a first communication connection;

a set of executable instructions configured to:

differentiate a payload portion of the first packet from a header portion of the first packet;

map a sequence number of the payload portion to a host memory location; and initiate a DMA (Direct Memory Access) transfer of the payload portion to the host memory location; and a set of data regarding the first communication connection;

the set of data describing a mapping window, said mapping window describing a sequence space of the first communication connection that the communication interface is configured to reassemble into host memory.

50. The communication interface of claim 49, wherein the set of data includes:

an anchor buffer identifier configured to identify a first host buffer in which to store the payload of a next packet expected in the first communication connection; and an anchor sequence number of the payload of the next packet expected in the first communication connection.

51. The communication interface of claim 50, wherein the set of data further includes:

an anchor buffer start offset configured to identify an offset location in the first host buffer;

wherein the anchor sequence number is mapped to the offset location.

52. The communication interface of claim 49, wherein the set of data includes:
- a list of host buffers in which to reassemble payloads of the first communication connection;
- wherein the size of the host buffers is specified by a destination application of the first communication connection.

53. The communication interface of claim 52, wherein the set of data further includes:
- for each host buffer in the list of host buffers, an indicator configured to indicate whether the host buffer is posted.

54. The communication interface of claim 49, wherein the set of executable instructions is further configured to forward the header portion of the first packet to one of the host computing devices.

* * * * *

UNITED STATES PATENT AND TRADEMARK OFFICE
CERTIFICATE OF CORRECTION

PATENT NO. : 7,142,540 B2
APPLICATION NO. : 10/198923
DATED : November 28, 2006
INVENTOR(S) : Hendel et al.

It is certified that error appears in the above-identified patent and that said Letters Patent is hereby corrected as shown below:

In claim 30 (at column 14, lines 20-25), replace
"mapping the sequence number to a first host buffer of the
    host computer device in which to store the payload portion,
    said mapping comprising;
  comparing the sequence number to an anchor sequence
    number associated with a mapping window of the
    communication connection;"
with
-- mapping the sequence number to a first host buffer of the
    host computer device in which to store the payload
    portion, said mapping comprising:
    comparing the sequence number to an anchor
      sequence number associated with a mapping window
      of the communication connection; --

In claim 39 (at column 15, lines 15-20), replace
"mapping the sequence number to a first host buffer of the
    host computer device in which to store the payload
    portion, said mapping comprising;
  comparing the sequence number to an anchor sequence
    number associated with a mapping window of the communication
    connection;"

UNITED STATES PATENT AND TRADEMARK OFFICE
CERTIFICATE OF CORRECTION

| | |
|---|---|
| PATENT NO. | : 7,142,540 B2 |
| APPLICATION NO. | : 10/198923 |
| DATED | : November 28, 2006 |
| INVENTOR(S) | : Hendel et al. |

It is certified that error appears in the above-identified patent and that said Letters Patent is hereby corrected as shown below:

In claim 39 (at column 15, lines 15-20), replace (cont'd)

with

-- mapping the sequence number to a first host buffer of the
    host computer device in which to store the payload
    portion, said mapping comprising:
    comparing the sequence number to an anchor
        sequence number associated with a mapping window
        of the communication connection; --

Signed and Sealed this

Twenty-second Day of May, 2007

JON W. DUDAS
*Director of the United States Patent and Trademark Office*